No. 794,512.

Patented July 11, 1905.

UNITED STATES PATENT OFFICE.

RUDOLF KNIETSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

CATALYTIC SUBSTANCE AND PROCESS OF MAKING SAME.

SPECIFICATION forming part of Letters Patent No. 794,512, dated July 11, 1905.

Application filed August 20, 1901. Serial No. 72,643.

*To all whom it may concern:*

Be it known that I, RUDOLF KNIETSCH, a subject of the King of Prussia, German Emperor, residing at Ludwigshafen-on-the-Rhine, in the Kingdom of Bavaria and Empire of Germany, have invented new and useful improvements in the manufacture of contact substances for use in the catalytic process for the manufacture of sulfuric acid and process of producing same, of which the following is a specification.

I have invented an improvement in the art of manufacturing sulfuric acid by the catalytic process. It is known that iron oxid, copper oxid, and chrome oxid and mixtures of these substances can be used as contact substances in the catalytic process for the manufacture of sulfuric anhydrid from sulfur dioxid and oxygen; but platinum has hitherto proved to be the best contact substance, and under similar conditions a far larger proportion of sulfur dioxid is converted into sulfuric anhydrid by platinum-black than by any of the other contact substances. When using platinum, it is possible, as is known, to obtain practically quantitative conversion of sulfur dioxid in suitably-purified pyrites gases into sulfur trioxid; but this best effect is hitherto only achieved with platinum-black upon a suitable substratum—namely, asbestos. Other substances—such as pumice, burnt clay, and the like—although they are porous, and so expose a large surface, are not suited for use as a substratum for platinum-black, and the results obtained with them are not so good as with the same amount of platinum on asbestos.

I have discovered that certain oxids of heavy metals—namely, iron oxid, copper oxid, chrome oxid, or mixtures thereof or bodies containing these substances—are eminently suited for use as substrata for platinum-black, notwithstanding their compact and not very porous nature. When these heavy oxids are used as catalytic substances alone, the temperature at which they have the greatest catalytic action is considerably higher than that at which the best effect is obtained with platinized asbestos; but I have found that when a layer of platinum is deposited on these substances the platinum not merely acts as energetically as it does when deposited on asbestos, but even at the comparatively low temperature at which the heavy oxids when used alone produce but slight effect. The new contact-body consists of a heavy metal oxid with a deposit of platinum upon it and acts with greater energy. Thus a layer of platinum on these substances does not prevent their activity as contact substances, but the catalytic action of the platinum-black is probably supported or increased by that of these bodies, so that the resulting body possesses at least as great catalytic action as does platinized asbestos. Even in the least porous form the said oxids can be used with great advantage as substrata for the platinum-black. For instance, well-burnt pyrites can be used; but there must be no arsenic or compounds thereof in the oxid, because if such were present deterioration of the catalytic activity of the platinum would be caused.

The substances which I have described and which are used in carrying my invention into effect can be resolved by known methods into platinum and a compound of the metallic oxid used as substratum for the platinum.

I give the following example to illustrate the manner in which the new contact substance for use in the manufacture of sulfuric acid can be obtained.

Example: Take one hundred and forty-five (145) parts, by weight, of burnt pyrites free from arsenic or compounds thereof and reduced to pieces having about the size of peas and screened, so as to be free from dust. Soak these uniformly with about thirty (30) parts, by weight, of a solution of platinum chlorid containing about seventeen (17) grams of platinum in the liter. Dry the resulting mass at a temperature of about seventy degrees centigrade, (70° C.,) and the resulting product can, as a rule, be at once used for catalytic purposes. If desired, it can first be heated before using.

The improvement that I have invented in the catalytic process for the manufacture of sulfuric acid consists in treating the containing sulfur dioxid and oxygen in the usual manner in contact with the new contact substance herein defined instead of using platinized asbestos or other contact substance hitherto known.

Having thus described my invention, I claim as new and desire to secure by Letters Patent—

1. The new catalytic substance which consists of burnt pyrites carrying a deposit of platinum.

2. The process of producing a catalytic substance which consists in impregnating burnt pyrites with platinum.

In testimony whereof I have hereunto set my hand in the presence of two subscribing witnesses.

RUDOLF KNIETSCH.

Witnesses:
 ERNEST G. EHRHARDT,
 JACOB ADRIAN.